(12) United States Patent
Murdock et al.

(10) Patent No.: US 9,376,924 B2
(45) Date of Patent: Jun. 28, 2016

(54) ELECTRICAL GROUNDING FOR FAN BLADES

(75) Inventors: James R. Murdock, Tolland, CT (US); Kwan Hui, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 1231 days.

(21) Appl. No.: 13/325,394

(22) Filed: Dec. 14, 2011

(65) Prior Publication Data

US 2013/0156588 A1 Jun. 20, 2013

(51) Int. Cl.
| | | |
|---|---|---|
| F01D 5/32 | (2006.01) | |
| F01D 5/14 | (2006.01) | |
| F01D 5/30 | (2006.01) | |
| F01D 5/28 | (2006.01) | |
| F01D 5/02 | (2006.01) | |
| F01D 25/28 | (2006.01) | |
| F02K 3/06 | (2006.01) | |
| F04D 29/32 | (2006.01) | |

(52) U.S. Cl.
CPC .. *F01D 5/30* (2013.01); *F01D 5/02* (2013.01); *F01D 5/147* (2013.01); *F01D 5/282* (2013.01); *F01D 25/28* (2013.01); *F02K 3/06* (2013.01); *F04D 29/324* (2013.01); *F05D 2240/303* (2013.01)

(58) Field of Classification Search
CPC ....... F01D 5/30; F01D 5/3007; F01D 5/3023; F01D 5/3069; F01D 5/147; F04D 29/324; F04D 29/325; F04D 29/388; H05F 3/02; F05D 2240/303

USPC .......................................................... 416/224
See application file for complete search history.

(56) References Cited

U.S. PATENT DOCUMENTS

| | | | |
|---|---|---|---|
| 5,123,813 A | 6/1992 | Przytulski et al. | |
| 5,354,176 A * | 10/1994 | Schilling et al. | .......... 416/204 R |
| 6,004,101 A | 12/1999 | Schilling et al. | |
| 8,851,855 B2 * | 10/2014 | James et al. | .................. 416/224 |
| 2011/0142644 A1 | 6/2011 | Fritz et al. | |

FOREIGN PATENT DOCUMENTS

| | | |
|---|---|---|
| EP | 2353830 | 8/2011 |
| EP | 2405101 | 1/2012 |

OTHER PUBLICATIONS

Search Report for corresponding European Patent Application No. 12196763.2 completed Feb. 6, 2013.

* cited by examiner

*Primary Examiner* — Dwayne J White
*Assistant Examiner* — Julian Getachew
(74) *Attorney, Agent, or Firm* — Carlson, Gaskey & Olds, PC

(57) ABSTRACT

A fan rotor includes a fan blade for use in a gas turbine engine includes a sheath formed of a material that is more conductive than a main fan blade body. A grounding element provides a grounding path from the sheath into a rotor receiving the fan blade. A gas turbine engine incorporating the fan blade is also disclosed.

16 Claims, 4 Drawing Sheets

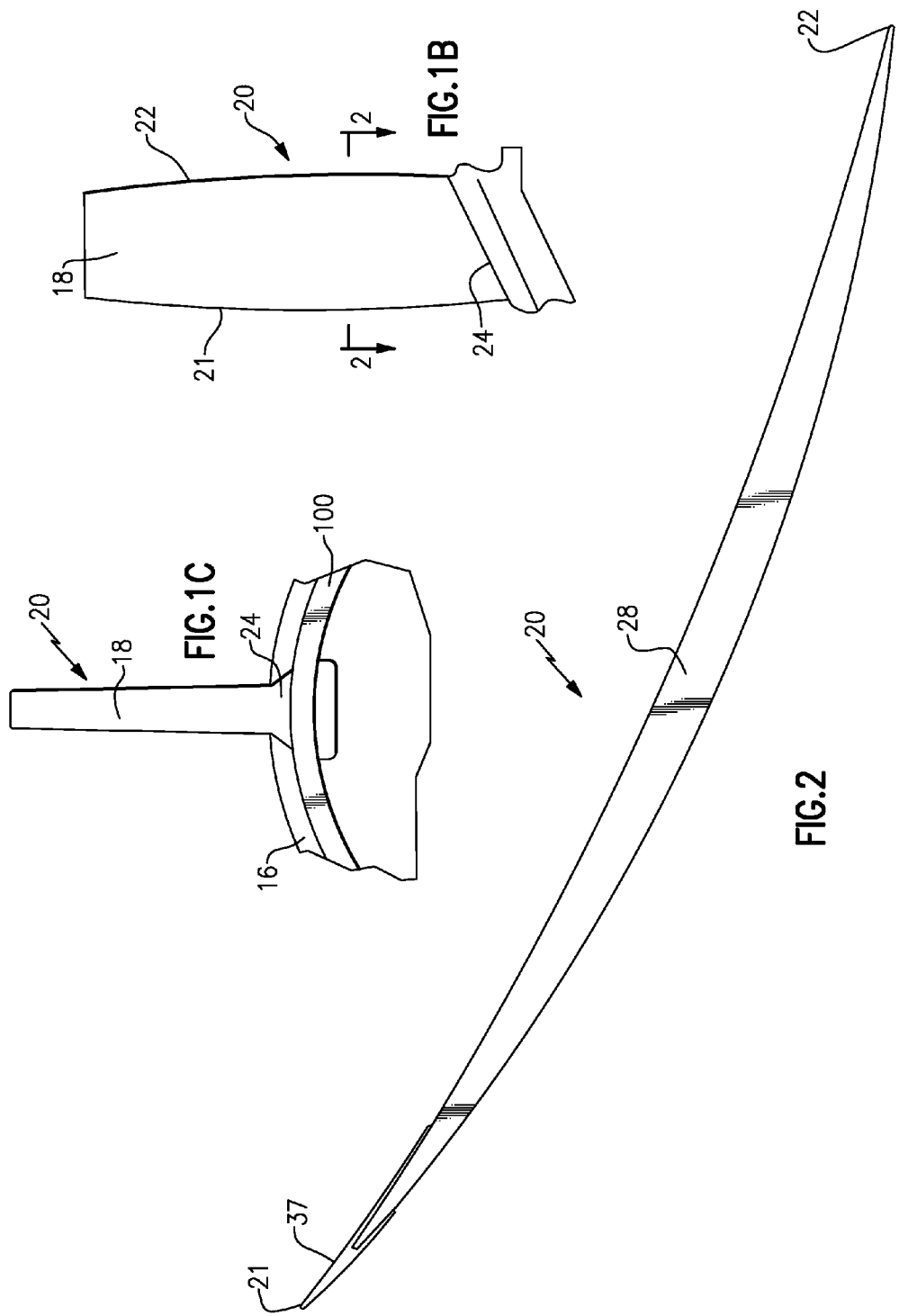

ELECTRICAL GROUNDING FOR FAN BLADES

BACKGROUND OF THE INVENTION

This application relates to a structure for electrically grounding fan blades for use in a gas turbine engine.

Gas turbine engines are known, and typically include a fan delivering air into a compressor section. In the compressor section, the air is compressed and then delivered into a combustion section. The compressed air is mixed with fuel and burned in the combustion section. Products of this combustion pass downstream to drive turbine rotors.

The fan blades are subject to a large volume of air moving across an airfoil, and this can build up a large static electric charge. Conventionally, the fan blades were formed of a conductive metal that was grounded to a hub that mounts the fan blade. As such, the charge would dissipate.

More recently, fan blades have become larger. One factor driving the larger fan blades is the use of a gear reduction between a turbine driven spool which drives the fan blade and the spool. The gear reduction allows a single turbine rotor to drive both a compressor section and the fan, but at different speeds.

As the size of the fan blade has increased, its weight has also increased. As such, efforts have been made to reduce the weight of fan blades. One modification is to change the material for the fan blade from titanium to an aluminum. The aluminum fan blades have been covered with a polyurethane coating and fabric wear pads to protect the aluminum. These materials have insulation qualities and, thus, the blade may not be electrically grounded to a rotor.

SUMMARY OF THE INVENTION

In one featured embodiment, a fan rotor has at least one slot receiving a fan blade. The fan blade is formed of a first material, and a sheath is positioned at a leading edge of said fan blade. The sheath is formed of second material that is distinct from the first material, and the first material is less electrically conductive than the second material. A grounding element is positioned in contact with the sheath, and in contact with a rotating element that rotates with the rotor. The grounding element and the rotating element thus form a ground path from the sheath into the rotor.

In another embodiment, the first material includes an outer coating that is relatively non-conductive compared to the second material.

In another embodiment, the rotor and grounding element are formed of a material that is more electrically conductive than the first material.

In another embodiment, the rotating element is separate from the rotor and formed of a material that is more electrically conductive than the first material.

In another embodiment, according to any of the foregoing embodiments, the rotating element is a lock ring which secures the fan blade within the rotor. The grounding element contacts the lock ring and the lock ring contacts the rotor to provide the grounding path.

In another embodiment, according to any of the foregoing embodiments, the grounding element sits radially inwardly of the sheath. The fan blade has a root received in the slot in said rotor. The grounding element extends radially inwardly along the root to contact the lock ring.

In another embodiment, according to any of the foregoing embodiments, the grounding element has a chin extending axially outwardly away from the rotor, and into contact with a radially inner portion of the sheath.

In another embodiment, according to any of the foregoing embodiments, the chin is spring biased against a radially inner end of the sheath.

In another embodiment, according to any of the foregoing embodiments, the grounding element has a circumferentially enlarged radially inner portion which is in contact with the lock ring.

In another embodiment, the first material includes a protective coating formed on the blade, and the second material contains titanium.

In another featured embodiment, a gas turbine engine includes a fan section, a compressor section, a combustor section, and at least one turbine rotor. The fan section includes a rotor body having at slot to receive a fan blade. The fan blade is formed of a first material, and a sheath is positioned at a leading edge of said fan blade. The sheath is formed of second material that is distinct from the first material, and the first material is less electrically conductive than the second material. A grounding element is positioned in contact with the sheath, and in contact with a rotating element that rotates with the rotor. The grounding element and the rotating element thus form a ground path from the sheath into the rotor.

In another embodiment, the first material includes an outer coating that is relatively non-conductive compared to the second material.

In another embodiment, the rotor and grounding element are formed of a material that is more electrically conductive than the first material.

In another embodiment, the rotating element is separate from the rotor and formed of a material that is more electrically conductive than the first material.

In another embodiment, according to any of the foregoing embodiments, the rotating element is a lock ring which secures the fan blade within the rotor. The grounding element contacts the lock ring and the lock ring contacts the rotor to provide the grounding path.

In another embodiment, according to any of the foregoing embodiments, the grounding element sits radially inwardly of the sheath. The fan blade has a root received in the slot in said rotor. The grounding element extends radially inwardly along the root to contact the lock ring.

In another embodiment, according to any of the foregoing embodiments, the grounding element has a chin extending axially outwardly away from the rotor, and into contact with a radially inner portion of the sheath.

In another embodiment, according to any of the foregoing embodiments, the chin is spring biased against a radially inner end of the sheath.

In another embodiment, according to any of the foregoing embodiments, the grounding element has a circumferentially enlarged radially inner portion which is in contact with the lock ring.

In another embodiment, the first material includes a protective coating formed on the blade, and the second material contains titanium.

These and other features of the invention will be better understood from the following specifications and drawings, the following of which is a brief description.

BRIEF DESCRIPTION OF THE DRAWINGS

FIG. 1B shows an aluminum fan blade.
FIG. 1C shows the aluminum fan blade mounted into a rotor.

FIG. 2 is a cross-sectional view along line 2-2 of FIG. 1B.

DETAILED DESCRIPTION

Figure 1A:
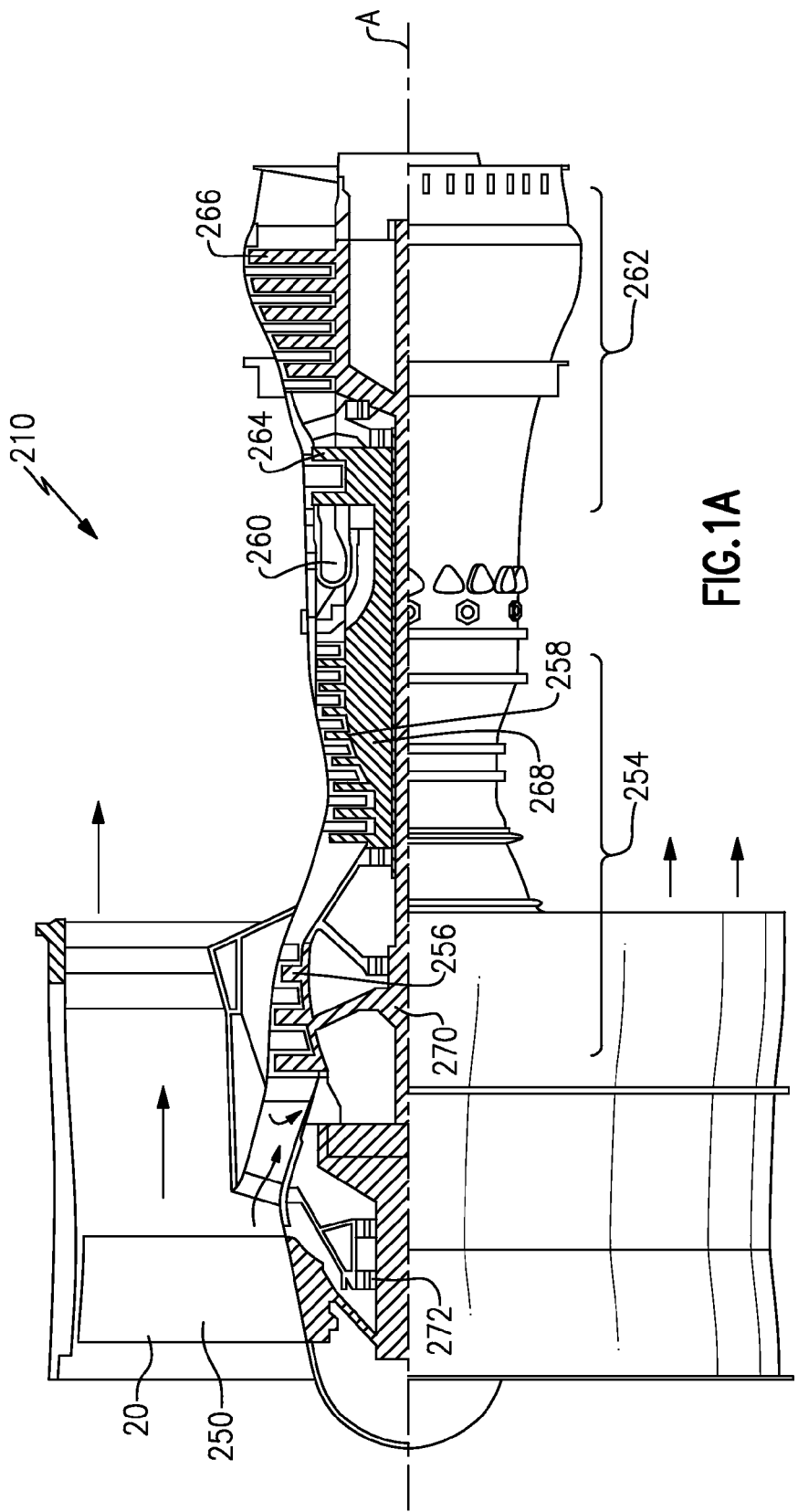
FIG. 1A shows an exemplary gas turbine engine.

A gas turbine engine 210 is shown in FIG. 1A. As shown, the engine 210 includes a fan 250 (which includes a plurality of fan blades 20), a compressor section 254 (which includes both a low pressure compressor 256 and a high pressure compressor 258), a combustor 260, and a turbine section 262 (which includes both a high pressure turbine 264 and a low pressure turbine 266). The high pressure compressor 258 is driven, via a first spool 268, by the high pressure turbine 264. The low pressure compressor 256 is driven, via a second spool 270, by the low pressure turbine 266. Also driven by the low pressure turbine 266 are the fan blades 20 of the fan 250, which is coupled to the second spool 270 via a gear reduction 272.

The fan 250 delivers air into compressor section 254. Air compressed by the compressor section is delivered into combustor 260. Products of the combustion in the combustor pass downstream over turbine section 262.

A fan blade 20 is illustrated in FIG. 1B having an airfoil 18 extending radially outwardly from a dovetail or root 24. A leading edge 21 and a trailing edge 22 define the forward and rear limits of the airfoil 18.

As shown in FIG. 1C, a fan rotor 16 receives the dovetail 24 to mount the fan blade 20 with the airfoil 18 extending radially outwardly. As the rotor is driven to rotate, it carries the fan blade 20 with it.

FIG. 2 shows a cross-section of the fan blade 20 at the airfoil 18. As shown, the leading edge 21 carries a sheath or cap 37 secured to a main body 28. The main body 28 may be formed of aluminum or various aluminum alloys. The main body may be coated with protective coatings, such as a polyurethane coating. In addition, fabric wear pads may be placed on the aluminum. The sheath 37 may be formed of a conductive material, such as titanium, titanium alloys or appropriate metals. The sheath 37 is thus formed of a material that is more electrically conductive than the material utilized to form the main blade body and the cover. This is due to the coating and the wear pads. Electrical charge may build up in the sheath 37.

As shown in FIG. 1C, a lock ring 100 locks the blades 20 within the rotor 16.

Figure 3:
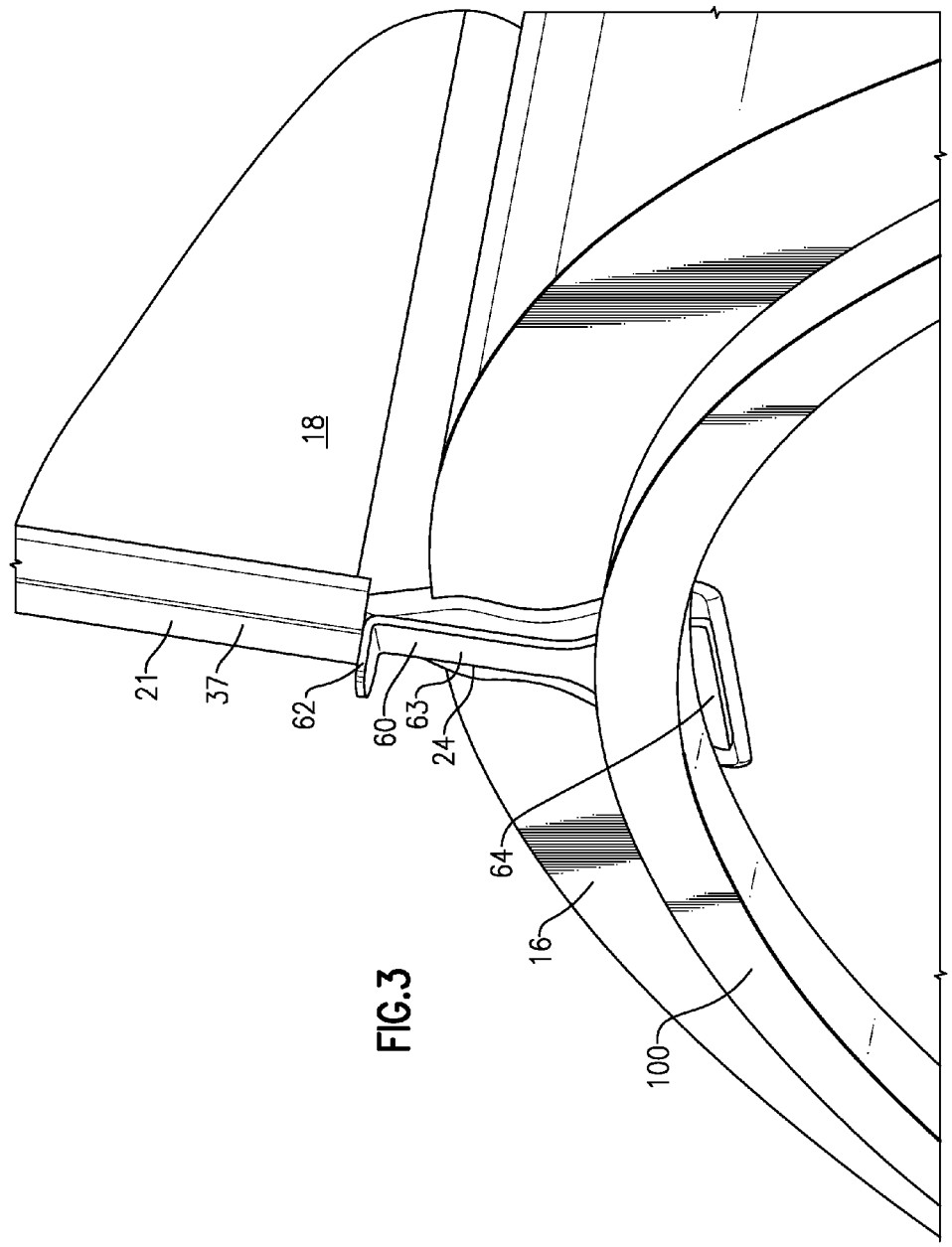
FIG. 3 shows an embodiment of this invention.

As shown in FIG. 3, the blade 20 is mounted within the rotor 16. The lock ring 100 abuts an end of the root 24, but also captures a grounding element 60. The grounding element 60 has a chin 62 extending axially outwardly from a main body portion 63. The chin has a free position which would extend upwardly in FIG. 3, such that it is biased against the radially inner end of sheath 37 in the illustrated position. The grounding element 60 is connected to the blade root 24 by an adhesive. Further, additional adhesive may be applied between the grounding element 60, and the coating on the blade at the edges of the bonding element. This additional adhesive can prevent moisture or objects to penetrate into the interface between the grounding element 60 and the blade 20. Examples of suitable adhesives include epoxy adhesive paste, such as Hysol & AF163K.

It is preferred that the adhesive be electrically insulating, or that some other electrically insulating material be utilized between the grounding element and the main body portion to prevent galvanic corrosion.

As shown in FIG. 3, an enlarged inner portion 64 of the grounding element 60 extends circumferentially outwardly to mimic the shape of root 24. This portion 64 is shown to be in direct surface contact with the lock ring 100.

The sheath 37, the grounding element 60, the lock ring 100 and the rotor 16 may all be formed of titanium or titanium alloy. As such, there is a direct ground connection between the sheath 37 to the rotor 16 such that electrical charge easily dissipates. Of course, other conductive materials could be used. Non-limiting examples include copper, steel, and nickel.

Figure 4:
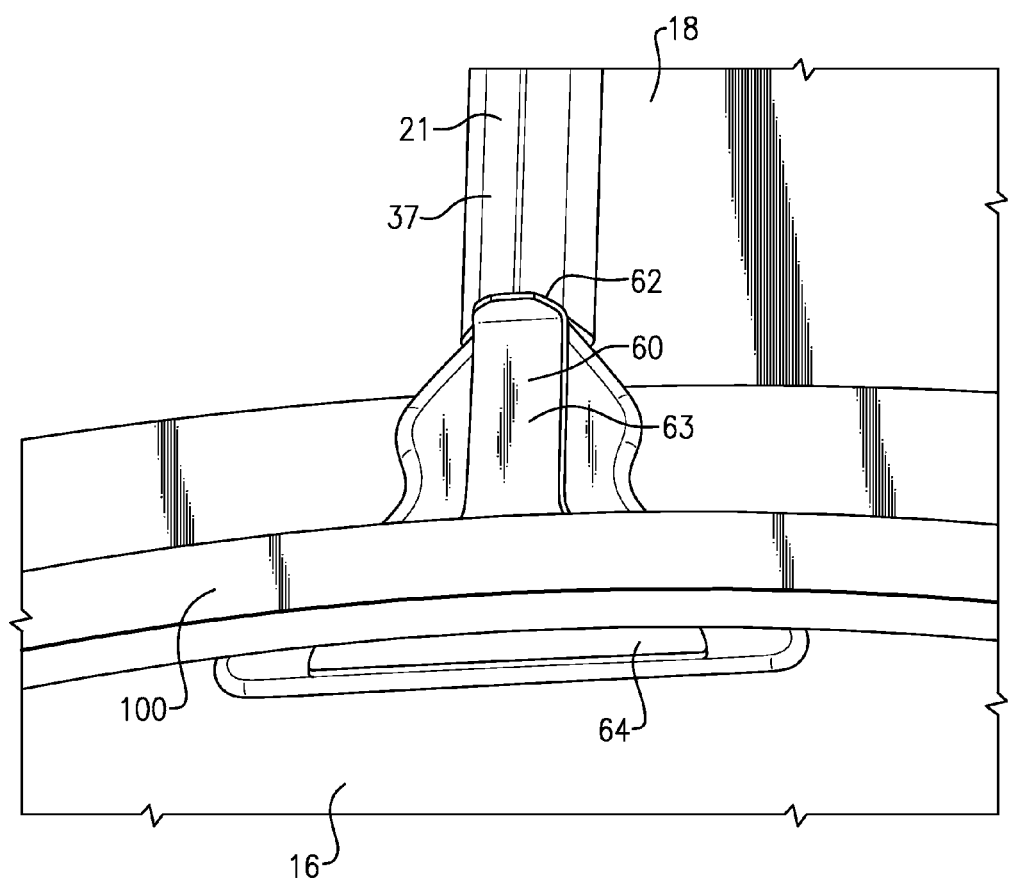
FIG. 4 is another view of the FIG. 3 embodiment.

As shown in FIG. 4, the lock ring 100 sits at the enlarged portion 64. The chin 62 is biased upwardly in this view, against a radially inner end of the sheath 37. Of course, any number of other ways of contacting the grounding element 60 to the sheath 37, and contacting the grounding element 60 to the rotor 16 and/or lock ring 100 may be utilized.

While the disclosed embodiment provides contact between the grounding element 63 and the lock ring 100, it is also possible to have the grounding element contact the rotor 16 directly.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fan rotor for use in a gas turbine engine comprising:
a rotor body having at least one slot receiving a fan blade;
said fan blade formed of a first material, and a sheath positioned at a leading edge of said fan blade, said sheath being formed of a second material that is distinct from said first material, said first material being less electrically conductive than said second material;
a grounding element in contact with said sheath, and said grounding element being in contact with a rotating element, said grounding element and said rotating element together forming a ground path from said sheath into said rotor;
wherein said rotating element is separate from said rotor and formed of a material that is more electrically conductive than said first material; and
wherein said rotating element is a lock ring which secures said fan blade in said rotor, said grounding element contacts said lock ring, and said lock ring contacts said rotor to provide said grounding path.

2. The fan rotor as set forth in claim 1, wherein said first material includes an outer coating that is relatively non-conductive compared to said second material.

3. The fan rotor as set forth in claim 1, wherein said rotor and said grounding element are formed of a material that is more electrically conductive than said first material.

4. The fan rotor as set forth in claim 1, wherein said grounding element sits radially inwardly of said sheath, and said fan blade has a root received in said at least one slot in said rotor, with said grounding element extending radially inwardly along said root to contact said lock ring.

5. The fan rotor as set forth in claim 4, wherein said grounding element has a chin extending axially outwardly away from said rotor, and in contact with a radially inner portion of said sheath.

6. The fan rotor as set forth in claim 5, wherein said chin is spring biased against said radially inner portion of said sheath.

7. The fan rotor as set forth in claim 1, wherein said grounding element has a circumferentially enlarged radially inner portion which is in contact with said lock ring.

8. The fan rotor as set forth in claim 1, wherein said first material includes a protective coating formed on said blade, and said second material contains titanium.

9. A gas turbine engine comprising:
- a fan section delivering air into a compressor section, said compressor section delivering air into a combustor section, and said combustor section delivering products of combustion across at least one turbine rotor, said at least one turbine rotor driving a compressor rotor, and said at least one turbine rotor also driving a fan rotor of said fan section through a gear reduction;
- said fan rotor including a rotor body having at least one slot to receive a fan blade, said fan blade formed of a first material, and a sheath positioned at a leading edge of said fan blade, said sheath being formed of a second material that is distinct from said first material, said first material being less electrically conductive than said second material;
- a grounding element in contact with said sheath, said grounding element being in contact with a rotating element, said grounding element and said rotating element together forming a ground path from said sheath into said fan rotor;
- wherein said rotating element is separate from said fan rotor and formed of a material that is more electrically conductive than said first material; and
- wherein said rotating element is a lock ring which secures said fan blade in said fan rotor, said grounding element contacts said lock ring, and said lock ring contacts said fan rotor to provide said grounding path.

10. The gas turbine engine as set forth in claim 9, wherein said first material includes an outer coating that is relatively non-conductive compared to said second material.

11. The gas turbine engine as set forth in claim 9, wherein said fan rotor and said grounding element are formed of a material that is more electrically conductive than said first material.

12. The gas turbine engine as set forth in claim 9, wherein said grounding element sits radially inwardly of said sheath, and said fan blade has a root received in said at least one slot in said fan rotor, with said grounding element extending radially inwardly along said root to contact said lock ring.

13. The gas turbine engine as set forth in claim 12, wherein said grounding element has a chin member extending axially outwardly away from said fan rotor, and in contact with a radially inner portion of said sheath.

14. The gas turbine engine as set forth in claim 13, wherein said chin is spring biased against said radially inner portion of said sheath.

15. The gas turbine engine as set forth in claim 9, wherein said grounding element has a circumferentially enlarged radially inner portion which is in contact with said lock ring.

16. The gas turbine engine as set forth in claim 9, wherein said first material includes a protective coating formed on said blade, and said second material contains titanium.

* * * * *